United States Patent [19]

Loporcaro et al.

[11] Patent Number: 4,993,728
[45] Date of Patent: Feb. 19, 1991

[54] TWO-WHEELED VEHICLE OF THE SULKY TYPE

[75] Inventors: Michel Loporcaro, 5, avenue Janvier Passero, 06210 Mandelieu; Jean-Eric Thorn, 249, avenue des Soles, 06250 Mougins, both of France

[73] Assignees: Michel Loporcaro, Mandelieu; Pierre Preville, Cannes la Bocca, both of France

[21] Appl. No.: 218,124
[22] PCT Filed: Oct. 5, 1987
[86] PCT No.: PCT/FR87/00379
§ 371 Date: Jul. 22, 1988
§ 102(e) Date: Jul. 22, 1988
[87] PCT Pub. No.: WO88/02328
PCT Pub. Date: Apr. 7, 1988

[30] Foreign Application Priority Data

Oct. 3, 1986 [FR] France .................. 86 13821

[51] Int. Cl.⁵ .............................................. B62C 1/00
[52] U.S. Cl. ................................. 280/63; 280/47.24; 280/75
[58] Field of Search ............. 280/63, 47.24, 70, 75, 280/152.2, 158.1

[56] References Cited

U.S. PATENT DOCUMENTS

| | | | |
|---|---|---|---|
| 378,837 | 2/1888 | Herrington | 280/75 |
| 3,415,533 | 12/1968 | Bliss, Jr. | 280/63 |
| 3,771,810 | 11/1973 | Barnett | 280/63 |
| 4,015,854 | 4/1977 | Ramond | 280/152.2 |
| 4,313,611 | 2/1982 | Heinze, Jr. et al. | 280/63 |

FOREIGN PATENT DOCUMENTS

| | | | |
|---|---|---|---|
| 2748437 | 7/1984 | Fed. Rep. of Germany | 280/63 |
| 137685 | 1/1920 | United Kingdom | 280/152.2 |

*Primary Examiner*—Charles A. Marmor
*Assistant Examiner*—Eric Culbreth
*Attorney, Agent, or Firm*—Hoffman, Wasson & Gitler

[57] ABSTRACT

A two-wheeled sulky comprises a transverse platform made of composite material, provided with two forward extensions for pulling the sulky, and two side forks which carry the wheels of the sulky. Each fork is made of a composite material, and comprises two side panels facing each other, interconnected by at least two transverse plate-like spacing elements, which impart to the fork a strong framework structure.

5 Claims, 10 Drawing Sheets

TWO-WHEELED VEHICLE OF THE SULKY TYPE

The object of the present invention is a two-wheeled vehicle of the sulky type used in harness trotting races.

It is known that vehicles of the sulky type are made up essentially of a deck whose upper central part is made to receive a seat for the driver, while the wheels are fastened to the lower end of the lateral legs of said deck. The deck appears in the form of welded metal tubes. Generally, this structure is reinforced by other tubes or rods, also welded. The result is that the sulky comprises a veritable ramification of tubes and rods whose production and whose repair, if necessary, are relatively complex.

The numerous welds present in such tubular structures constitute as many potential rupture points that can be the cause of serious accidents.

It can also happen that a horse's hoof will accidentally get into the spaces located between the tubes or rods of a nearby sulky, which can also be the cause of serious accidents. The risks are particularly great when a clumsy passing is made, and also at the time of the start of the race, when the competitors are aligned along a front that is definitely wider than the actual racetrack and then are made to narrow down this front to get to the racetrack.

It can also happen that two wheels of neighboring sulkies will touch each other. In this case, the wheels can engage with each other when the sulky that has gotten behind pushes forward and is then destabilized, with the risk of a fall for the driver.

The object of the present invention is a two-wheeled vehicle of the sulky type that makes it possible to eliminate these various disadvantages. This vehicle, which comprises a transverse plate made of composite material comprising, toward the front, two lateral extensions constituting the shafts or the beginning of the shafts, with said transverse plate being equipped with a seat or means of fastening a seat for the driver and being assembled with two forks for fastening the wheels, is characterized in that each fork, made of composite material, comprises two lateral panels facing each other that are connected by at least two transverse spacer elements in the form of plates.

The transverse plate can comprise, at the rear, a median extension, optionally tilted upward, that is intended to receive the driver's seat.

The transverse plate, including its forward and rear extensions, can be produced as a single piece and can be equipped with stiffening ribs that also are made of composite material.

The single transverse plate can be replaced by two plates: one transverse plate proper, of approximately rectangular shape, and an upper longitudinal plate whose median part is fastened to said transverse plate by appropriate fastening means, said upper plate being adapted to receive, at its rear end, a seat for the driver, and also comprising, toward the front, two extensions in the form of longitudinal arms intended to be used for fastening detachable shafts. As was mentioned above, the rear end, which is intended to receive the seat, is preferably tilted upward in relation to the plane of the median part. Further, in this embodiment, the transverse plate can be replaced by two half-plates placed symmetrically in relation to the longitudinal axis of the vehicle, each half-plate resting on one of said forks. Of course, the transverse plate and the upper plate are made, as was mentioned above, of composite material and can be reinforced with appropriate stiffening ribs.

The forward lateral extensions can constitute the shafts and be made in a single piece along with the transverse plate. The forward extensions can also be shorter and, at their front ends, can be provided with fastening means for detachable shafts. They can be provided, on their inner side, with a standard toe clip, but, as will be seen below, this is not always necessary.

An important characteristic of the vehicle is that the wheel forks consist of two lateral panels equipped with two transverse spacer elements in the form of plates that keep the two panels apart from each other to leave a space sufficient for the passage of the wheel between the two panels. Consequently, the wheel forks comprise a structure of the "framework" type that not only ensures sufficient rigidity of the assembly but also offers other advantages that will be mentioned below.

The composite materials of which the plates and the forks of the sulky of the invention are made are preferably composite materials of the sandwich type. i.e., materials consisting of a core (for example, rigid synthetic foam or a honeycomb structure) that is reinforced externally by a laminate consisting of fibers or fabrics bound with an appropriate resin. The core, for example, is a polyvinyl chloride or polyurethane foam. The laminates (in the form of fibers, mats or fabrics) are produced, for example, by means of glass fiber, carbon fibers or Kevlar fibers (an aromatic polyamide fiber marketed by du Pont de Nemours). The resin, which serves simultaneously as a binder for the laminate and as an adhesive for fastening the laminate to the core of the composite, is a usual resin such as, for example, an epoxy resin, a polyester resin or a phenolic resin.

According to a first embodiment, the lateral panels of the forks have an approximately triangular shape and are fastened to the lower face of the transverse plate by one of the sides, with the vertex opposite said side constituting the lower end of the panel. This lower end is provided with means of fastening the wheel axle, for example, a fitting.

The triangular panels preferably have a shape that is elongated toward the front. In this case, it is necessary for the forward extensions of the transverse plate (the rear part of the shafts) to be located in the plane of the wheels so that contact of the panel with the transverse plate takes place, beyond said plate proper, with the lower face of the rear part of the shaft.

In this first embodiment, the two spacer elements can be located, respectively, in front of and behind the lateral panels, between the two panels of the fork and perpendicular to it, for example, along the front and rear sides of said panels. These spacer elements undergo an appropriate slot, if necessary, to permit the passage of the wheel when they are vertical to it.

When the triangular panels have a shape that is elongated toward the front, a streamlining element can be attached in the form of a rounded "V" connecting the front sides of the two panels of the fork, this streamlining element, for example, being made of fiber glass impregnated with resin. The forward spacer element can also be given a section that is appropriate for a streamlining element in front of the wheel. A rear streamlining element can also be attached, joining the rear sides of the two lateral panels and surrounding the upper part of the wheel.

According to a second embodiment, each lateral panel of the forks has a trapezoidal shape, the large base of the trapezium being fastened to the lower face of the transverse plate and the corresponding forward extension, while the small base constitutes the lower part of the panel, it being understood that the forward end of the large base is located farther forward than the forward end of the small base. In the vicinity of its rear end, the small base comprises means of fastening the wheel axle, for example, a fitting.

As was mentioned above, the spacer elements can be placed in front of and behind the panels. However, it is advantageous to provide two spacer elements of rectangular shape located in front of the wheels, between the two panels and perpendicular to them: a first spacer element located (as was mentioned above) along the front sides of the panels, and a second spacer element tilted toward the rear from its lower side, fastened to the first spacer element to its upper side, fastened to the lower face of the forward extension of the transverse panel. Thus, a framework with a triangular section that can constitute a resting place for the driver's feet after an appropriate opening has been cut out, in front of the second spacer element, in the inside lateral panel, is made at the forward end of the fork. The driver's feet can thus rest on the first spacer element, while the second spacer element, located behind his foot, protects it against splashings of water or mud.

As was mentioned above, the forks can receive a front and a rear streamlining element, it being understood that the front spacer element can comprise a section that is appropriate for the front streamlining element.

Of course, in this second embodiment, the forward extensions of the transverse plate must be located approximately in the plane of the wheels. The lower end of the second spacer element is fastened to the first spacer element at a sufficient distance from his seat so that the driver can place his feet as indicated above. The second spacer element can be, for example, approximately perpendicular to the first spacer element.

Particular nonlimiting embodiments will now be described, with reference to the accompanying drawings, in which.

Spacer elements similar to those that have just been described, permitting making toe clips, can also be used in case triangular lateral fork panels are used, provided that said triangular panels have a shape that is elongated toward the front, i.e., that the forward edge of these lateral panels joins the lower face of the shaft sufficiently in front of the wheels and the point where the shafts originate is located in the plane of the wheels.

Figure 1:
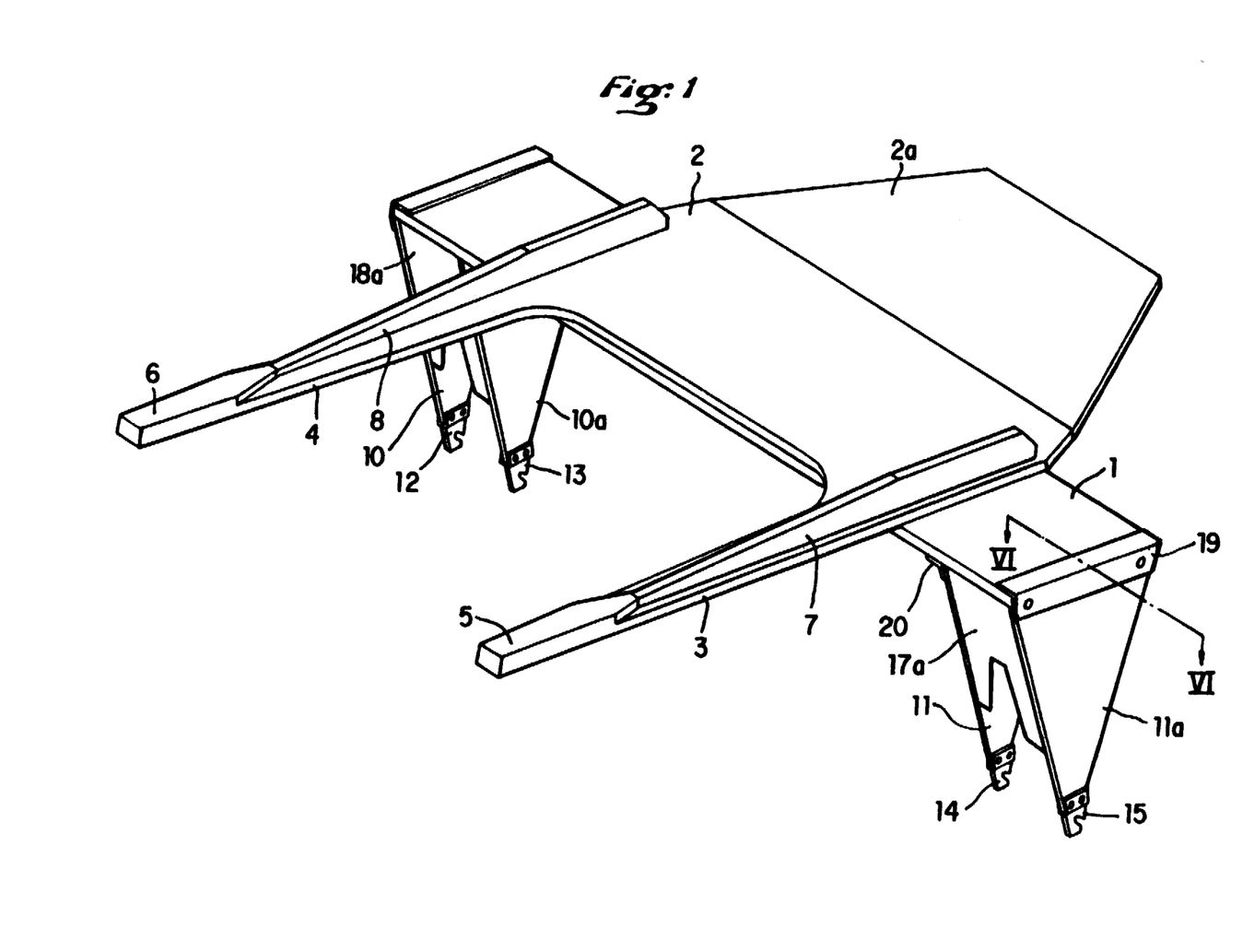
FIG. 1 represents a view in perspective of the frame of a vehicle according to the invention, with a plate in two parts.

The frame represented in FIG. 1 consists of a transverse plate 1 to which the upper plate 2 is fastened, for example, by means of bolts. The positioning of the plate 2 on the plate 1 can be facilitated by centering pins (not shown). The plate 2 is extended toward the front by two arms or side members 3, 4. The front ends of the side members have an extra thickness 5, 6. The side members also comprise a stiffening rib 7, 8. It can be seen that the rear end 2a of the upper plate 2, which is intended to receive one or two seats, is tilted slightly upward to improve the position of the driver and his possible passenger.

A fork 10, 10a, 11, 11a for fastening wheels by fittings 12, 13, 14, 15 is fastened to each end of the transverse plate.

Figure 2:
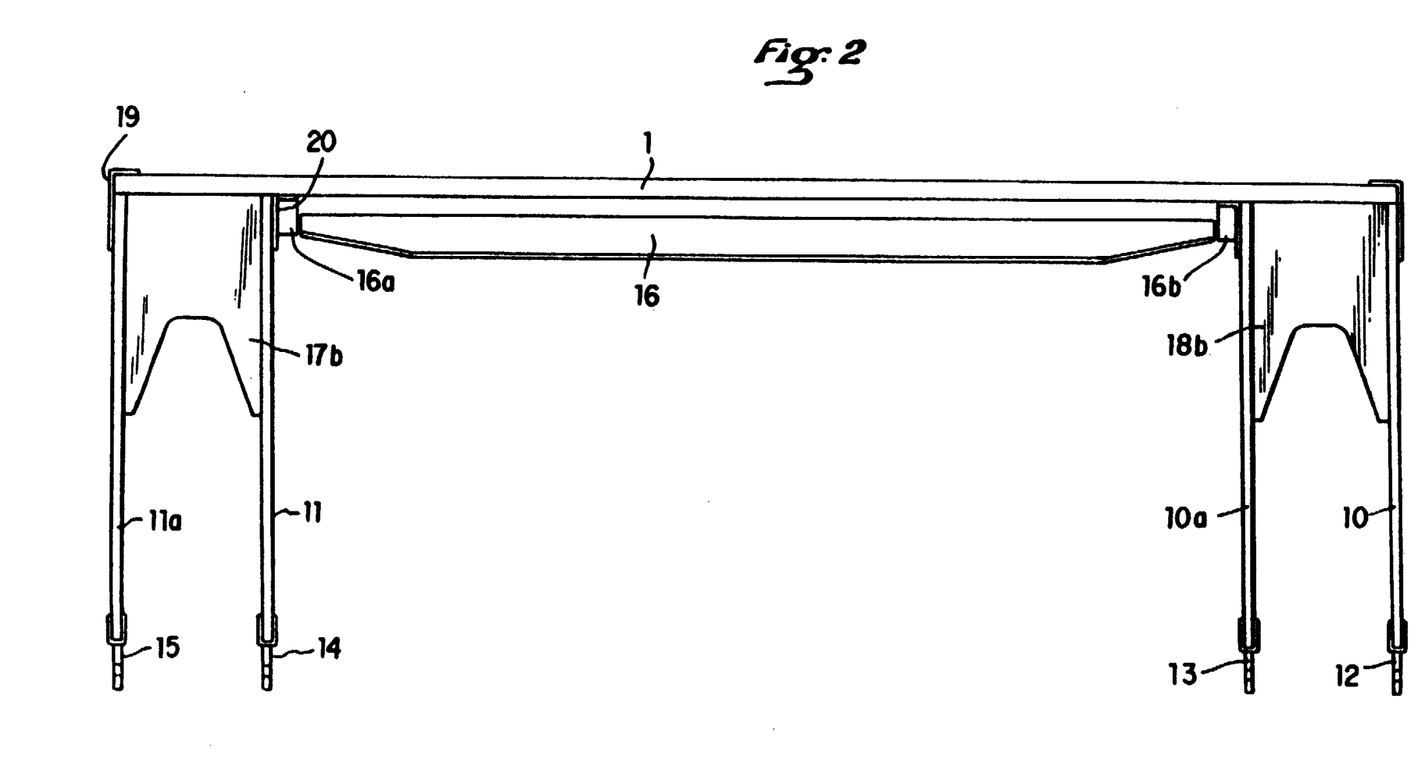
FIG. 2 represents a rear view (without the upper plate) of the frame shown in FIG. 1.
Figure 3:
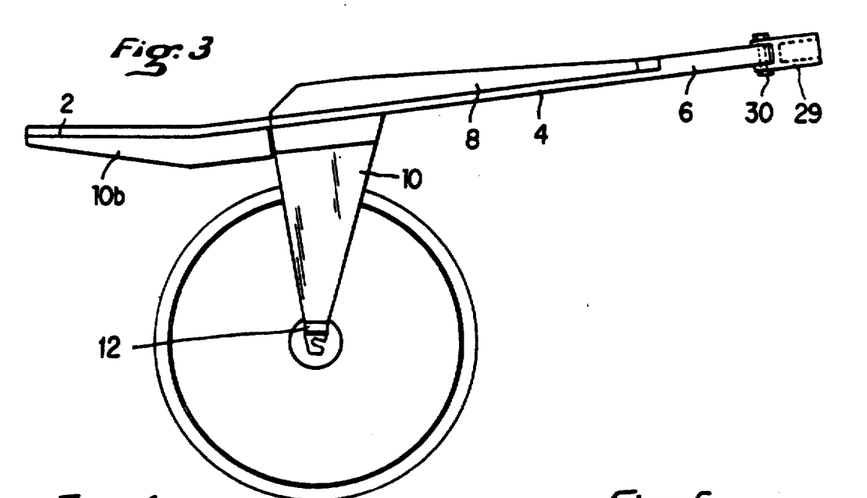
FIG. 3 is a profile view of this vehicle mounted on wheels.
Figure 7:
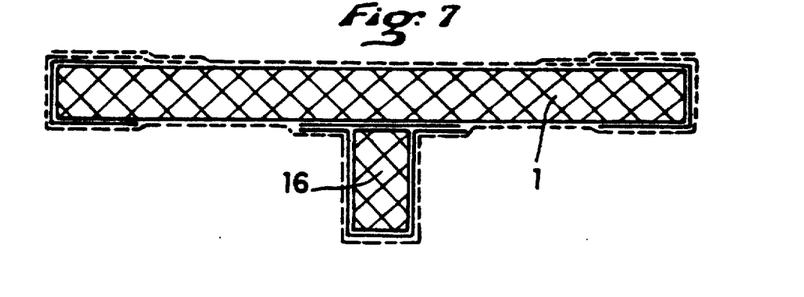
FIG. 7 is a diagrammatic representation in section, provided as an example, of the structure of the laminate constituting the transverse plate equipped with a stiffening element.

In FIGS. 2 and 7, it can be seen that transverse plate 1 comprises a stiffening element 16 (rib) making it possible to improve the rigidity of said plate. Two similar lateral stiffening elements 16a, 16b are also provided behind the upper plate (FIGS. 2 and 3).

Figure 4:
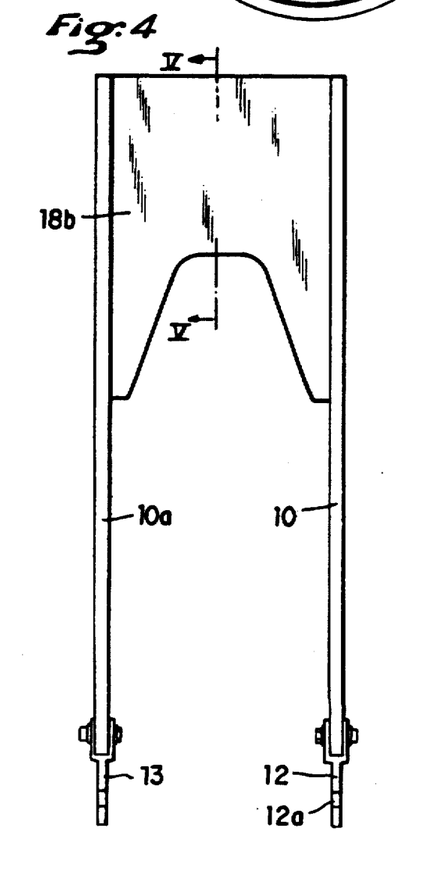
FIG. 4 is a rear view of a fork.
Figure 5:
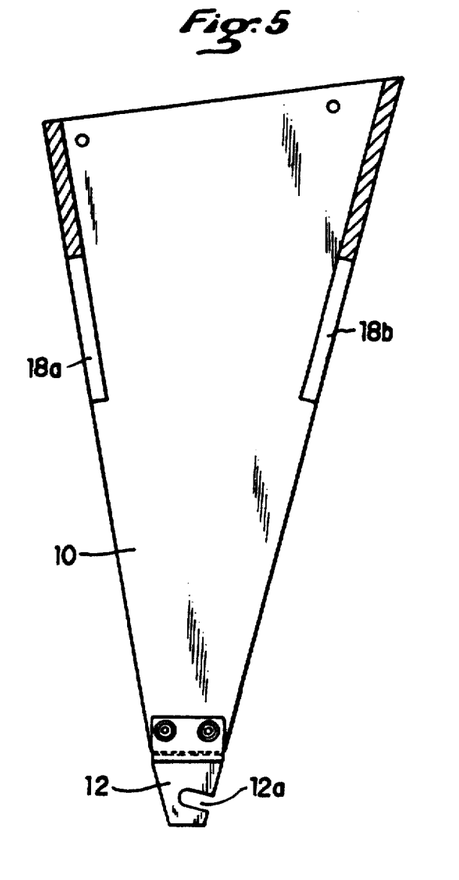
FIG. 5 is a view in section along V—V in FIG. 4.

In FIGS. 1, 2, 4 and 5, it can be seen that the lateral panels such as 10, 10a of a fork are held in position by front and rear spacer elements 18a and 18b, forming a brace and having a shape adapted to allowing the passage of the wheel. Also, the fork 11, 11a is equipped with similar front and rear spacer elements 17a and 17b. The fittings such as 12 comprise housing 12a for the wheel axle (FIGS. 4 and 5).

Each fork such as 11, 11a is fastened to the transverse plate by angle brackets 19, 20.

Figure 6:
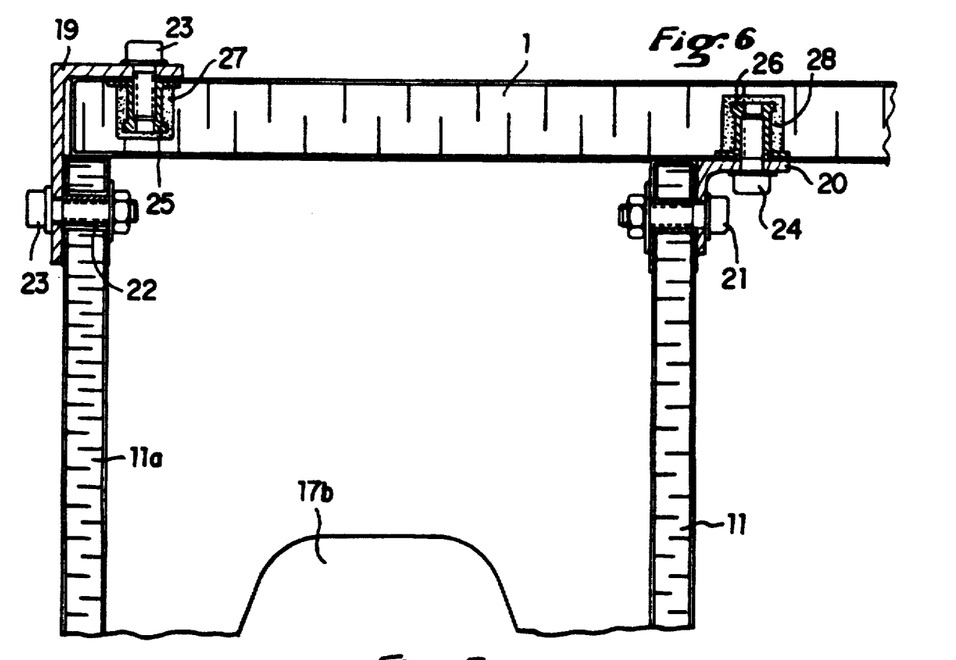
FIG. 6 is a partial view in section along VI—VI in FIG. 1, showing the detail of the fastening of a fork to the transverse plate.

In FIG. 6, it can be seen that the angle bracket 19 is fastened to the panel 11a of the fork by a smooth metal insert 22 permitting the passage of the bolt 23. The angle bracket 20 is fastened to the panel 11 in a similar way with the bolt 21. Also, the angle brackets 19 and 20 are fastened, respectively, to the plate 1 with the bolts 23, 24 by threaded metal inserts 25, 26 that are fastened in recesses 27, 28 by gluing.

In FIG. 3, it can be seen that it are possible to fit, to the end of the side members such as 6, a case 29 (represented in section) that is fastened by a bolt 30 and comprising at its forward end, a housing permitting the insertion of the shafts (not shown), which are fastened to said case by appropriate fastening means (nut and bolt).

The metal inserts, like the angle brackets, the fittings and the fastening cases such as 29 are made of aluminum, for example.

In FIG. 7, it can be seen that the transverse plate 1 and the stiffening rib 16 are made in the form of panels of synthetic rigid foam represented by crossed lines (polyvinyl chloride, polyethylene, polyurethane, etc.) covered with layers of glass fabrics (for example, two layers of glass fabric with a thickness of 0.3 mm, symbolized by a broken line), and reinforced at the ends and the connections between the panels by a fabric of carbon fibers (for example, two layers with a thickness of 0.2 millimeters, symbolized by a continuous line). A similar technique, also standard, is used for making and joining various structural elements of composite material. The laminates are made according to the standard techniques, for example, with a one-face mold. The fabric is applied to the rigid foam and fastened by a resin applied with a brush, for example, an epoxy resin comprising an accelerator and a usual hardening agent). Commercial fabrics preimpregnated with resin can also be used. Then a "gel coat" that gives the piece a finished appearance can be applied. The entire unit is then subjected to a heat treatment at a temperature that is generally below 120° C.

Figure 8:
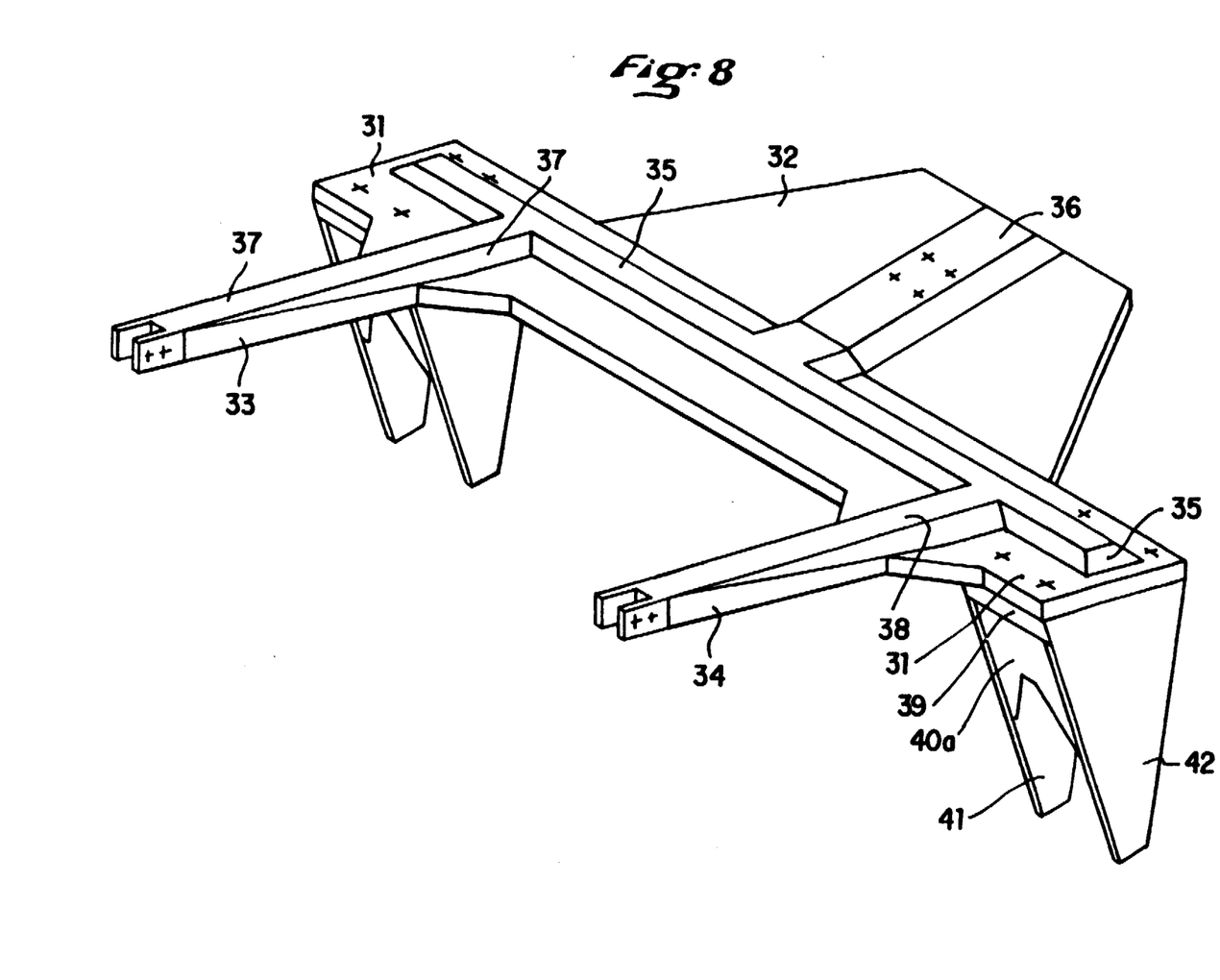
FIG. 8 represents a view in perspective of another embodiment, with a plate in a single part.

The sulky represented in FIG. 8 is made with a single plate 31 comprising a median extension 32 toward the rear and extended toward the front by two longitudinal arms 33, 34. Part 32 is tilted upward slightly, at an angle of 15° in relation to the plane of the plate 31.

The longitudinal arms 33, 34 are adapted at their forward ends to receive detachable shafts. Plates 31, 32 and arms 33, 34 are provided with stiffening ribs 35, 36, 37, 38 on their upper faces.

Each wheel fork comprises a shoulder such as 39, two lateral panels such as 41, 42, and two front and rear spacer elements such as 40a (the front spacer element) and 40b (the rear spacer element, which cannot be seen in FIG. 8).

Figure 9:
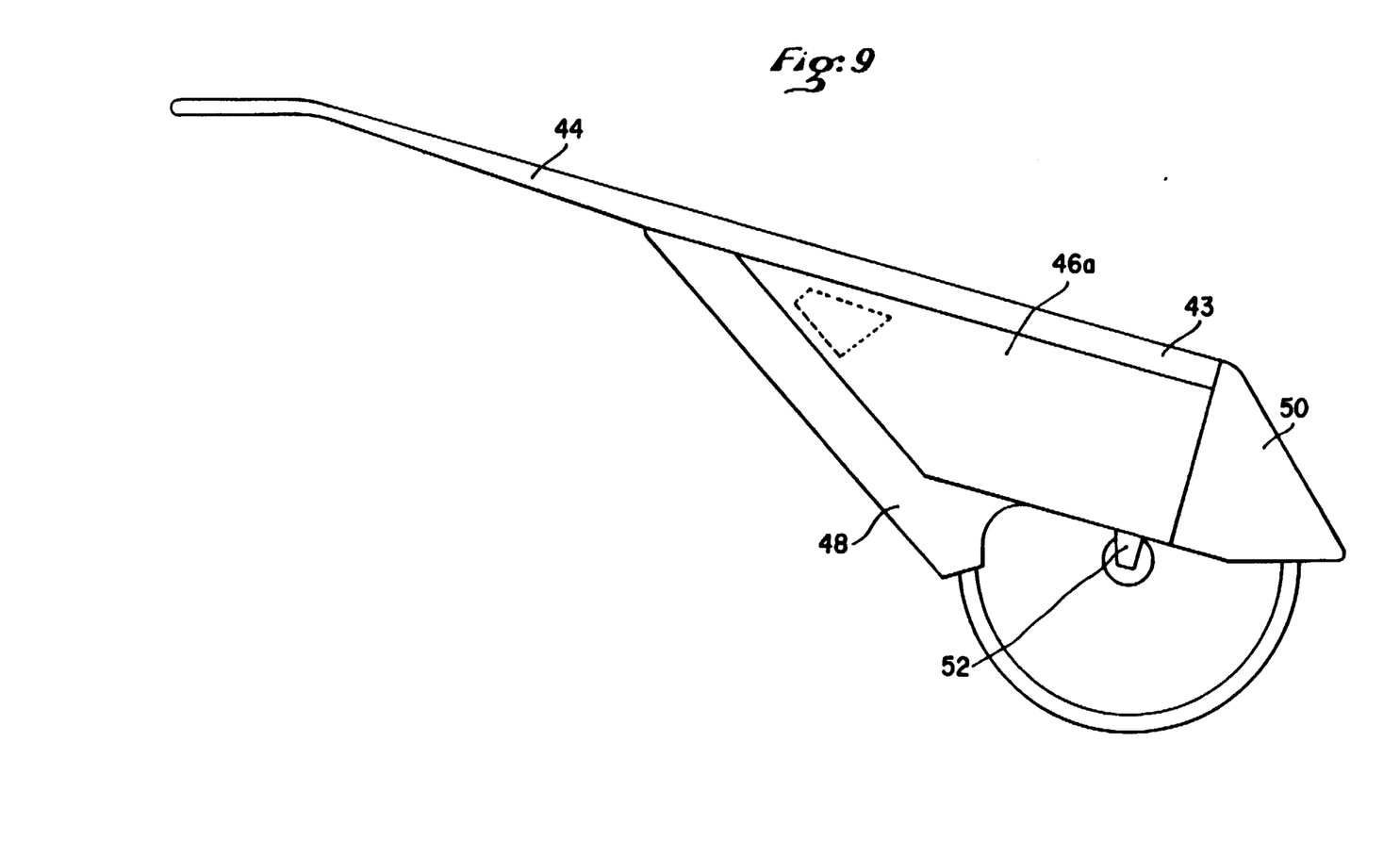
FIG. 9 is a profile view of another embodiment, with trapezoidal fork lateral panels and shafts made in one piece with the transverse plate.
Figure 10:
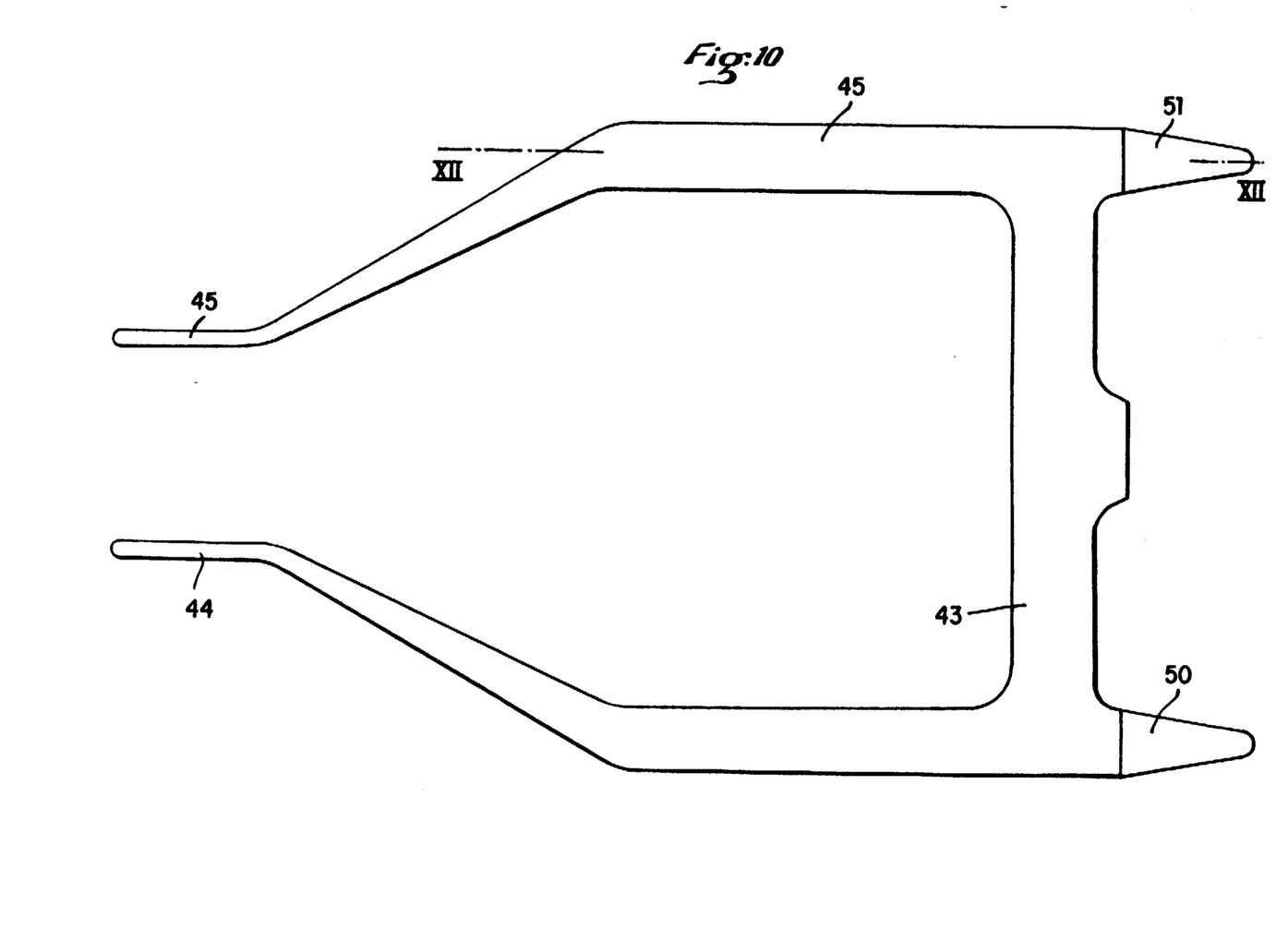
FIG. 10 is a top view of the sulky of FIG. 9.
Figure 11:
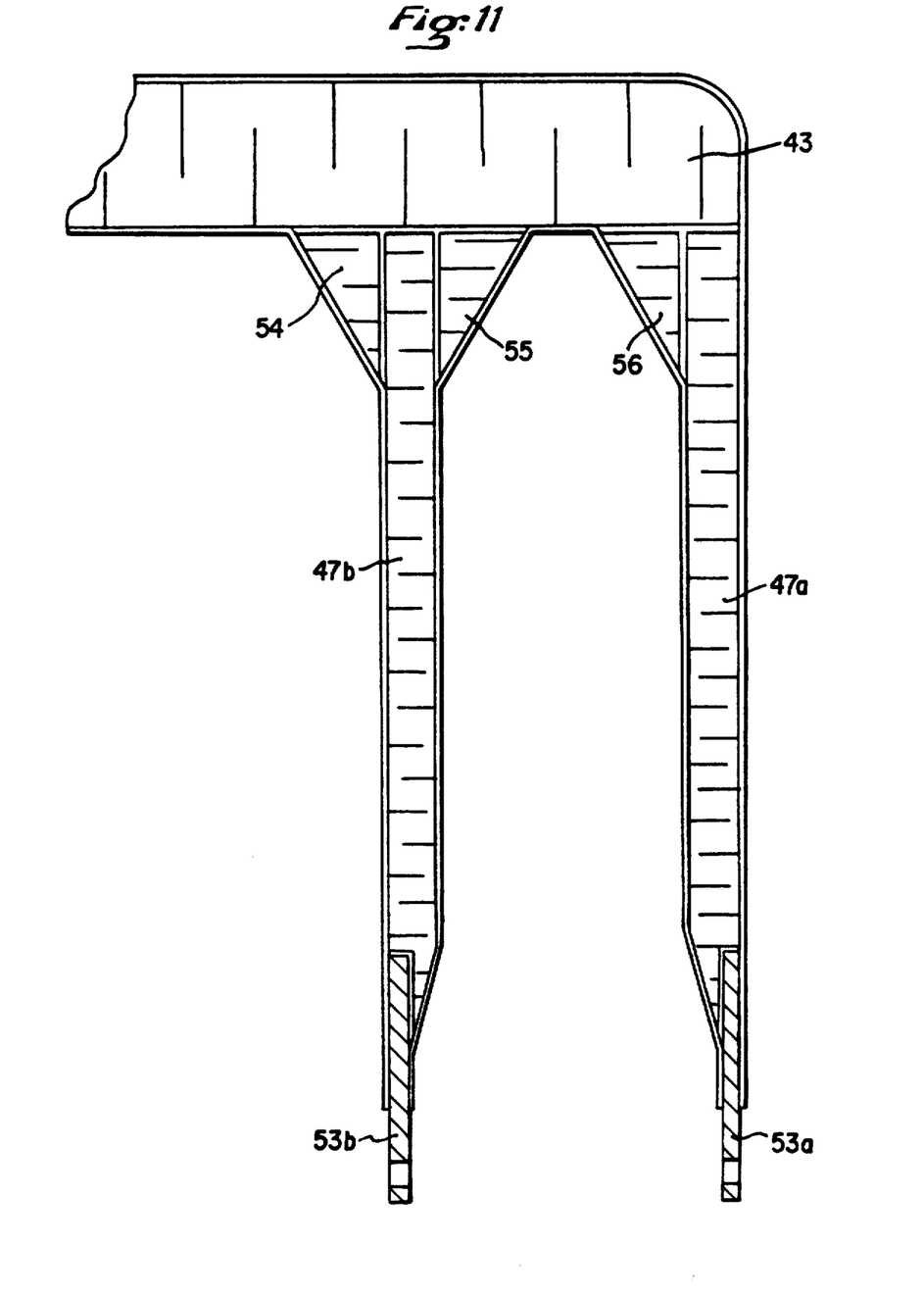
FIG. 11 is a view in cross section, at the level of the fitting, of a wheel fork fastened to the lateral end of the transverse plate of the sulky of FIG. 9.
Figure 12:
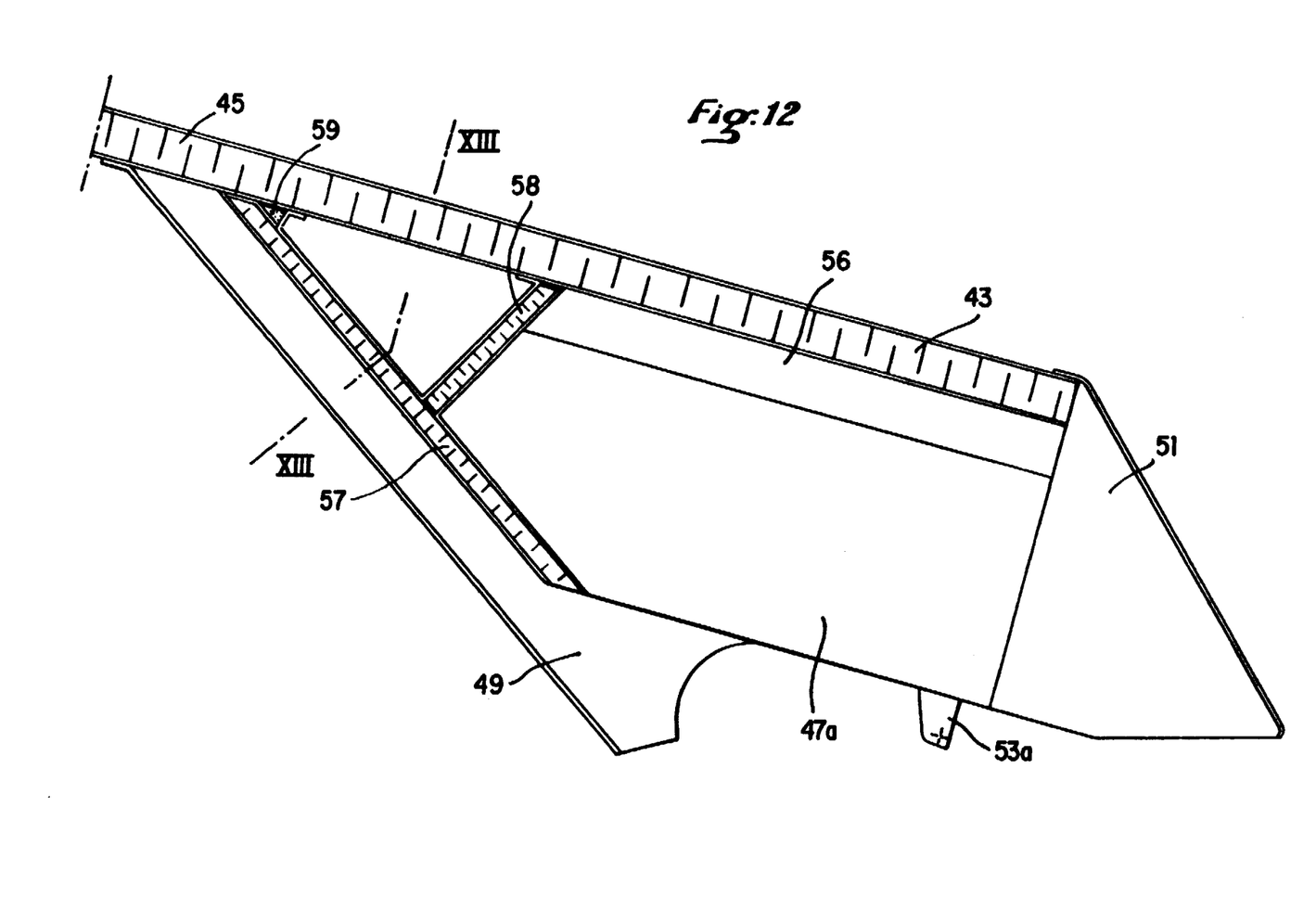
FIG. 12 is a partial view in longitudinal section along XII—XII of FIG. 10.

The holes for fastening the seat are represented by crosses on rib 36. The holes for fastening the forks are represented by crosses on plate 31. The holes for fastening the detachable shafts are represented by crosses at the front ends of lateral arms 33, 34. All the elements of the sulky represented in FIG. 9 are made of composite laminated material. To fasten the forks, panel 39 is first assembled with the spacer elements such as 40, and then lateral panels 41 and 42 are assembled on the unit thus formed. The entire unit is then fastened to the lower face of plate 31, for example, nuts and bolts.

The sulky represented in FIGS. 9 to 13 comprises a transverse plate 43 made in a single piece with the shafts 44, 45. Each fork comprises two trapezoidal lateral panels such as outside panels 46a and inside panels (not seen) of the fork located on the left side of the vehicle, and outside panels 47a and inside panels 47b of the fork located on the right side. Each fork is equipped with a front streamlining element 48, 49 and a rear streamlining element 50, 51. The lines of separation between panel 46a and rear streamlining element 50 or front streamlining element 48 are indicated on FIG. 9 for understanding of the drawing, but they cannot be seen on the finished sulky after the laminated coverings have been applied. The rear streamlining element does not allow the wheels to project. In the vicinity of the rear ends of their bases, the lateral panels are equipped with fittings such as 52, 53a, 53b for fastening the wheels.

Foam panels 43, 47a, 47b are assembled by gluing with an Araldite adhesive (registered trademark for an epoxy adhesive). The gluing zones are indicated by thickened lines on FIG. 11. The various perpendicular assemblies are reinforced by the triangular glued foam sections such as 54, 55, 56. Fittings 53a, 53b are glued in recesses made in the foam of panels 47a, 47b. The fabrics coated with resin, symbolized by a continuous line surrounding the foam structure, are applied to this foam structure and cover the inside and outside faces of the forks and the plate as well as all the surfaces of the shafts. The upper parts of the fittings of the wheels are partially covered by these coverings of impregnated fabric.

Each fork such as (47a, 47b) is equipped with a first rectangular spacer element such as 57 placed along the front sides of the fork (FIG. 12), from the lower face of shaft 45 to the base of lateral panels 47a, 47b. A second rectangular spacer element 58 extends between lateral panels 47a, 47b, perpendicular to first spacer element 57. The second spacer element, whose base rests on spacer element 57, is consequently tilted toward the rear from its base to its upper end, which coincides with the lower face of shaft 45. The spacer elements, just like the other elements, are made of rigid foam and are covered by impregnated fabrics symbolized by continuous lines in FIG. 12. Consequently, the two spacer elements delimit a framework with a triangular section at the front upper end of the fork.

By means of a slot, for example, of trapezoidal shape, made in inside panels 46b and 47b, this framework can act as a toe clip. The shape of the slot is represented by dotted lines in FIG. 9.

The rear edge of the slot is made along the front face of spacer 58. The lower edge of the slot is along the upper face of spacer 57. The upper edge of the slot is parallel to the lower edge of the shaft. Consequently, the driver can put his feet into the framework with a triangular section, letting them rest on the upper face of spacer 57. The introduction of these feet into this framework, and their removal, is accomplished more easily than with the standard toe clips.

The presence of spacer 58 behind the framework protects it from the splashing of water or mud caused by the wheels. Consequently, this system of toe clips represents an element of comfort and security for the driver.

Figure 13:
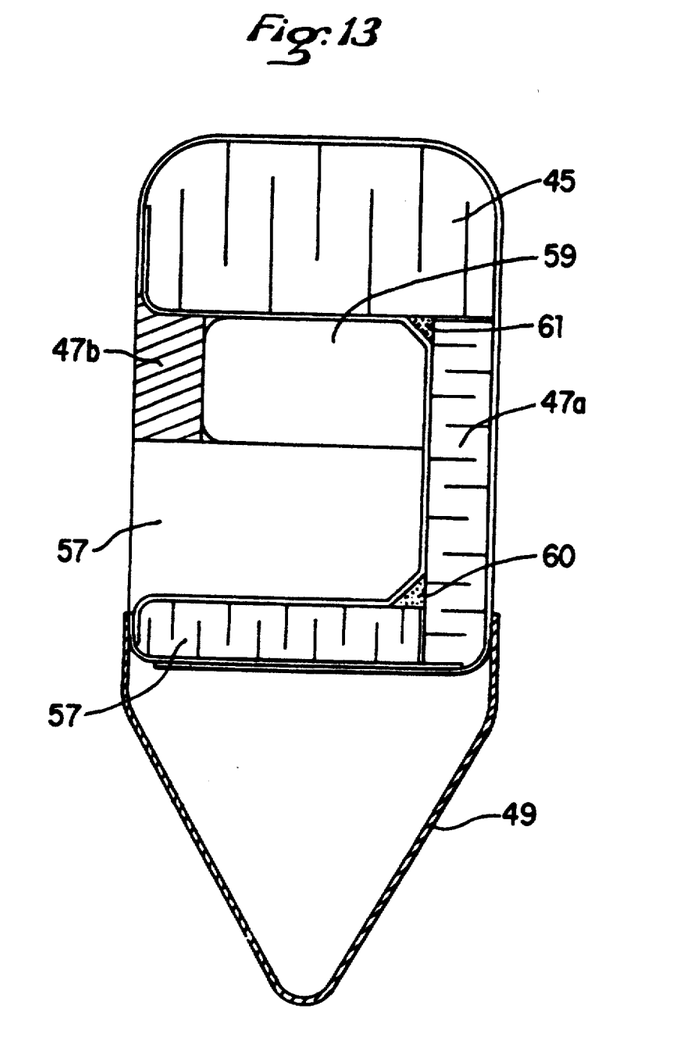
FIG. 13 is a view in cross section along XIII—XIII of FIG. 12.

In FIG. 13, which represents a section of the toe clip framework, the inside and outside fabric coverings are represented by continuous lines. Inside the framework, the various joints are smoothed off by wedges of mastic filled with glass fiber such as 59, 60, 61. These wedges make covering with fabrics easier by avoiding right angles or acute angles.

What is claimed is:

1. A two-wheeled vehicle comprising
   a transverse platform, made of composite material, said platform having upper and lower surfaces, and two extensions directed toward a front end of the vehicle, each of said extensions forming at least a portion of a shaft for pulling the vehicle, and
   two forks for supporting respective wheels of the vehicle, wherein each fork is made of a composite material, and comprises two spaced lateral panels, interconnected by at least two transverse spacer elements, each of said panels being approximately trapezoidal in shape and having a horizontal upper edge which is fastened to the lower surface of the transverse platform, wherein said spacer elements are rectangular and located forward of said wheel, a first of said spacer elements being located along a front side of the lateral panels, and a second of said spacer elements being inclined rearwardly upward from its lower edge, which is fastened to the first spacer element, to its upper side, which is fastened to the lower surface of a respective forward extension of the transverse panel.

2. The invention of claim 1, wherein each inboard lateral panel has an opening providing a footrest on said first spacer element.

3. A two-wheeled vehicle, comprising
a transverse platform, made of composite material, said platform comprising two extensions toward its front constituting at least parts of shafts for pulling the sulky, said platform and extensions having upper and lower surfaces, and
two forks for supporting respective wheels of the sulky, wherein each fork is made of composite material comprises a framework structure and includes two lateral spaced panels, interconnected by at least two transverse plate-like spacer elements,
each of said panels being approximately trapezoidal in shape, and being fastened along one of its sides to the lower surface of said platform,
each fork further comprising two rectangular spacer elements located in front of the wheels, a first of said spacer elements extending between front edges of the lateral panels, and a second of said spacer elements being inclined upward toward the rear from its lower side, which is fastened to the first spacer element, to its upper side, which is fastened to the lower surface of one of said extensions of the transverse platform.

4. The invention of claim 3, further comprising a front streamlining element connecting the front sides of the two panels of the fork.

5. The invention of claim 3, further comprising a rear streamlining element connecting the rear sides of the two panels of the fork.

* * * * *